United States Patent [19]
Kutschenreuter, Jr.

[11] Patent Number: 5,397,077
[45] Date of Patent: Mar. 14, 1995

[54] HIGH PERFORMANCE SUPERSONCI BLEED INLET

[75] Inventor: Paul H. Kutschenreuter, Jr., Loveland, Ohio

[73] Assignee: General Electric Company, Cincinnati, Ohio

[21] Appl. No.: 205,967

[22] Filed: Mar. 3, 1994

[51] Int. Cl.⁶ .................................... B64D 33/02
[52] U.S. Cl. ......................... 244/53 B; 137/15.1
[58] Field of Search ................... 244/53 B, 35 A; 137/15.1, 15.2

[56] References Cited

U.S. PATENT DOCUMENTS

| | | | |
|---|---|---|---|
| 2,969,939 | 1/1961 | Sulkin et al. | 244/53 B |
| 2,997,843 | 8/1961 | Arnett et al. | 137/15.2 |
| 3,062,489 | 11/1962 | Himka | 244/53 B |
| 3,199,810 | 8/1965 | Stroud et al. | 244/53 B |
| 3,242,671 | 3/1966 | Moorehead | 60/35.6 |
| 3,295,555 | 1/1967 | James et al. | |
| 3,417,767 | 12/1968 | Young | 137/15.2 |
| 3,460,554 | 8/1969 | Johnson | 137/15.2 |
| 3,495,605 | 2/1970 | Gunnarson et al. | 137/15.1 |
| 3,570,512 | 3/1971 | Thompson | 137/81.5 |
| 3,589,379 | 6/1971 | Daues | 137/15.1 |
| 3,613,704 | 10/1971 | Goldsmith | 137/15.2 |
| 3,643,676 | 2/1972 | Limage et al. | 137/15.2 |
| 3,799,475 | 3/1974 | Mitchell et al. | 244/53 B |
| 3,941,336 | 3/1976 | Nangia | 244/53 B |
| 3,981,144 | 9/1976 | Milling et al. | 60/270 R |
| 3,984,784 | 10/1976 | Pinsley | 330/94.5 |
| 3,998,393 | 12/1976 | Petty | 239/553.5 |
| 4,000,869 | 1/1977 | Wong et al. | 244/53 B |
| 4,007,891 | 2/1977 | Sorensen et al. | 244/53 B |
| 4,025,008 | 5/1977 | Peikert | 244/53 B |
| 4,154,256 | 5/1979 | Miller | 137/15.1 |
| 4,307,743 | 12/1981 | Dunn | 137/15.1 |
| 4,381,017 | 4/1983 | Bissinger | 244/53 B |
| 4,620,679 | 11/1986 | Karanian | 244/53 B |
| 4,641,678 | 2/1987 | Haas et al. | 244/53 B |
| 4,991,795 | 2/1991 | Koncsek | 244/53 B |
| 5,088,660 | 2/1992 | Karanian | 244/53 B |
| 5,116,001 | 5/1992 | Perry | 244/53 B |
| 5,116,251 | 5/1992 | Bichler et al. | 137/15.1 |

*Primary Examiner*—Andres Kashnikow
*Assistant Examiner*—Virna Lissi Mojica
*Attorney, Agent, or Firm*—Jerome C. Squillaro; David L. Narciso

[57] ABSTRACT

An inlet bleed system for a supersonic aircraft engine having a longitudinally downstream extending inlet bounded by a boundary wall that in part defines a supersonic flowpath through the inlet, a transversely extending boundary layer scoop extends into a boundary layer region of the flowpath and has an upstream facing bleed aperture, and a shock generating means for generating a shockwave in a supersonic flow in the flowpath such that the shockwave passes through the bleed aperture. One embodiment provides a scoop which extends a height above the wall such that it is operable to scoop off no more than a sufficient amount of a boundary layer flow that would exist in the boundary region and be momentum deficient relative to predetermined conditions that would exist downstream of the scoop under supersonic operating conditions. Another embodiment provides for the scoop to be disposed a throat section of the inlet wherein the aperture located is just upstream of the normal shock location.

11 Claims, 2 Drawing Sheets

HIGH PERFORMANCE SUPERSONCI BLEED INLET

BACKGROUND OF THE INVENTION

1. Field of the Invention

This invention relates to a supersonic flight vehicle and more particularly to a supersonic engine bleed inlet for optimizing engine performance.

2. Description of Related Art

Aircraft engines which are designed to operate at supersonic speeds often have engine inlet configurations with bleed systems including bleed inlets that must operate in complex supersonic flow fields. Through viscosity, friction extracts momentum from the flow (boundary layer) nearest the wall. Portions of the boundary layer experience momentum reductions large enough to be incompatible with momentum requirements further downstream. Unless such deficient momentum air is removed or re-energized, the boundary layer subsequently separates. Such separation reduces the total pressure recovery, increases flow distortion levels, and can lead to unstable flow conditions. In order to compensate for this problem, engine inlets have to be sized larger than would otherwise be required for a non-separated engine inlet flow. Therefore, it is very desirable to have an engine inlet that can operate at high Mach number supersonic flow without boundary layer separation, in order to operate safely and efficiently and to be able to design and operate lower weight supersonic aircraft engines.

It is well known in the supersonic propulsion field, to use inlet boundary layer bleed systems, for removing boundary layer flow along the interior inlet walls for engines designed to operate at supersonic flight Mach numbers, in order to avoid these problems. While the use of such inlet boundary layer bleed systems results in improvements in both engine cycle performance and engine stability, a drag penalty is paid since such bleed air is ultimately discharged to ambient conditions at a lower exit momentum than its freestream level upstream of the bleed inlet. Optimizing thrust minus drag at a given fuel flow helps optimize system performance. Therefore, it is also very desirable to have an engine inlet that can operate at high Mach number supersonic flow without boundary layer separation and also reduces the drag penalty due to bleed flow momentum losses.

This can is accomplished in the present invention by reducing the amount of bleed flow required to achieve the increased total pressure recovery and reduced airflow distortion. Test data on typical boundary layer bleed systems indicate that in order to achieve the desired pressure recovery increase and distortion reduction, the amount of boundary layer which must be removed is more than twice the amount which was initially momentum deficient. Major contributing factors to the need for this excessive amount of bleed are the pressure disturbances originating downstream at the shockwave interaction, which propagate upstream through the subsonic portion of the boundary layer. Such pressure disturbances distort the upstream boundary layer flow profiles, which then become a source for additional losses and distortion in the main stream flow above the boundary layer.

There is a great and long felt need among supersonic aircraft and aircraft engine designers for a supersonic inlet bleed system that can operate efficiently to prevent boundary layer separation with a minimum amount of boundary layer bleed flow and drag. The present invention is directed towards such an inlet bleed system.

SUMMARY OF THE INVENTION

The aforementioned and other disadvantages of the prior art are overcome by an inlet bleed system for a supersonic aircraft engine having a longitudinally downstream extending inlet bounded by a boundary wall that in part defines a supersonic flowpath through the inlet, a transversely extending boundary layer scoop that extends into a boundary layer region of the flowpath and has an upstream facing bleed aperture, and a shock generating means for generating a shockwave in a supersonic flow in the flowpath such that the shockwave passes through the bleed aperture.

One embodiment provides a scoop which extends a height above the wall such that it is operable to scoop off no more than a sufficient amount of a boundary layer flow that would exist in the boundary region and be momentum deficient relative to predetermined conditions that would exist downstream of the scoop under supersonic operating conditions. A more particular embodiment scoops off a portion of the boundary layer having total pressure levels less than downstream static pressure levels required to sustain a downstream oblique shockwave downstream of the aperture and having a predetermined oblique shockwave angle that would be generated by the scoop under supersonic operating conditions. Another more particular embodiment scoops off a portion of the boundary layer having local profile Mach numbers lower than those which would support a downstream oblique shockwave downstream of the aperture, having a predetermined oblique shockwave angle, and that would be generated by the scoop under supersonic operating conditions. A yet more particular embodiment provides a scoop having a height which is about 18% of a boundary layer height of the boundary layer.

One embodiment of the present invention provides a section of the boundary wall that is spilt into an upstream part and a downstream part wherein the downstream part is raised above the upstream part so as to extend into the flowpath thereby forming the scoop and the upstream facing bleed aperture. A more particular embodiment provides a porous section of the upstream part just aft of its leading edge with small normal or downstream inclined bleed holes.

Yet another embodiment provides for the present invention to be incorporated in a throat section of the inlet having a convergent section including the upstream part that is disposed at an angle with respect to the downstream part which is raised above the upstream part so as to extend into the flowpath.

BRIEF DESCRIPTION OF THE DRAWINGS

The foregoing aspects and other features of the invention are explained in the following description, taken in connection with the accompanying drawings where.

DETAILED DESCRIPTION OF THE INVENTION

Figure 1:
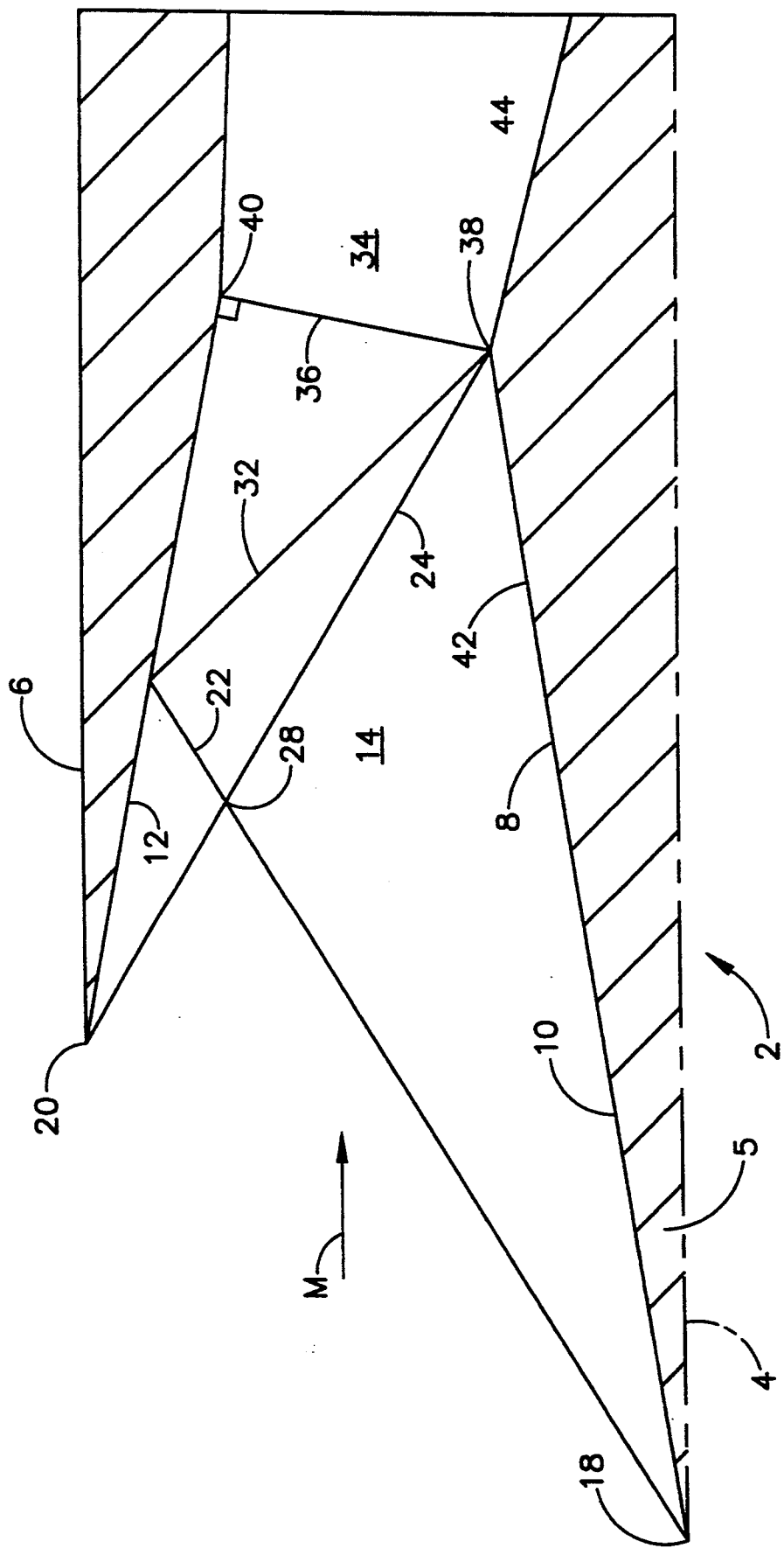
FIG. 1 is a cross-sectional diagrammatical view of a supersonic engine inlet illustrating two embodiments of the present invention.

Diagrammatically illustrated in FIG. 1 is a supersonic engine inlet 2, from its centerline 4 outward, including a centerbody 5 and a cowl 6 disposed in a supersonic freestream flow having a downstream direction denoted by an arrow representing the freestream Mach Number M. Note that the supersonic engine inlet 2 of the present invention may be two dimensional or axisymmetrical about its centerline 4. Note that the line shown as centerline 4 may, in an alternative embodiment of the present invention, be the outer boundary of the inlet instead of the centerline. Between the centerbody 5 and the cowl 6 is a longitudinally downstream extending inlet duct 8 which in part defines a supersonic inlet flowpath 14 through the inlet duct. The supersonic inlet flowpath 14 is bounded by a centerbody boundary wall 10 extending at an oblique angle with respect to the freestream flow from a centerbody leading edge 18 and a cowl boundary wall 12 extending at an oblique angle with respect to the freestream flow from a cowl leading edge 20. Under freestream supersonic flow conditions a first oblique upstream shockwave 22 is generated from the centerbody leading edge 18 and a second oblique upstream shockwave 24 is generated from the cowl leading edge 20. Although the first and second oblique upstream shockwaves 22 and 24 respectively interact at their intersection 28 causing them to bend, the degree to which they do bend is relatively small (i.e. for a freestream Mach Number=2.5 which is a representative design Mach Number) and therefore this bending is not shown in the FIGS.

FIG. 1 illustrates two places along the supersonic inlet flowpath 14 where inlet bleed systems in accordance with the present invention may be used. The first (shown in FIG. 2) is at a longitudinal position along the cowl boundary wall 12 where the first oblique upstream shockwave 22 reflects off the wall as an oblique downstream shockwave 32. The second (shown in FIG. 3) is at a throat 34 of the inlet duct 8 where ideally a normal shock 36 is maintained at a 90° angle to the cowl boundary wall 12 across the flowpath 14 from a centerbody wall shoulder 38, between a compression ramp 42 and an expansion ramp 44 of the centerbody boundary wall 10, to a cowl wall shoulder 40. Ideally the supersonic engine inlet 2 is designed such that the second oblique upstream shockwave 24 and the oblique downstream shockwave 32 intersect the centerbody boundary wall 10 at the centerbody wall shoulder 38 at the throat 34.

Figure 2:
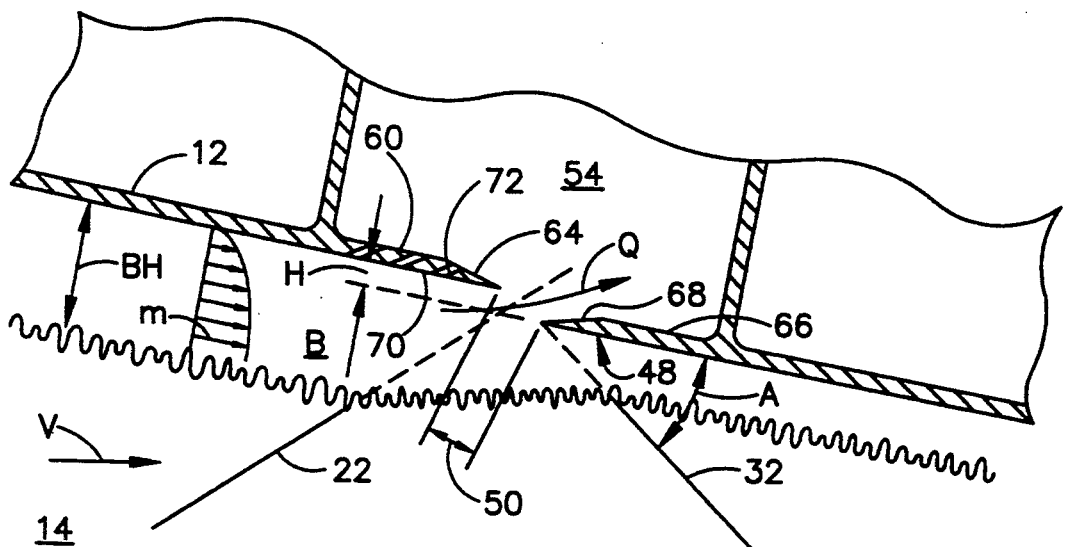
FIG. 2 is a view of a first one of the two embodiments of the present invention illustrated in FIG. 1.

FIG. 2 illustrates, in cross-secton, a transversally extending boundary layer scoop 48, in a direction normal to the plane of the cross-sectional view and normal to the direction of the supersonic flow V of the flowpath 14, which extends a height H from the cowl boundary wall 12 into a boundary layer region B of the flowpath and has an upstream facing bleed aperture 50 such that the first oblique upstream shockwave 22 passes through the bleed aperture into a bleed plenum 54. This prevents the first oblique upstream shockwave 22 from impinging on the cowl boundary wall 12 thus minimizing upstream propagation through the boundary layer region B along the cowl boundary wall 12 due to a pressure rise across the shockwave as is the case in more conventional supersonic inlet designs.

One embodiment of the present invention provides a scoop 48 and aperture 50 which extends a height H above the cowl boundary wall 12 into the boundary layer region B such that it is operable to scoop off no more than a sufficient amount of a boundary layer flow Q that would exist in the boundary region and be momentum deficient relative to or as a function of predetermined conditions that would exist downstream of the scoop under supersonic operating conditions in the supersonic inlet flowpath 14 and cause the boundary layer flow to separate from the wall. There are several analytical, empirical, and semi-empirical methods that are well known in the field to determine the sufficient amount of a boundary layer flow Q and height H. One example of such predetermined conditions is pressure levels wherein the scoop 48 is constructed to scoop off a portion of the boundary layer having total pressure levels less than downstream static pressure levels required to sustain the downstream oblique shockwave 32 downstream of the aperture 50 and having a predetermined oblique shockwave angle A that would be generated by the scoop under supersonic operating conditions. Another more particular embodiment scoops off a portion of the boundary layer having local profile Mach numbers m lower than those which would support the downstream oblique shockwave 32 downstream of the aperture 50 and its predetermined oblique shockwave angle A that would be generated by the scoop under supersonic operating conditions.

The present invention was developed for what is referred to as a High Speed Civil Transport (HSCT) designed to operate at a cruise Mach Number M equal to about 2.5 at an altitude of about 70,000 feet. It has been determined that for such freestream conditions the height H optimally should be about 18% of a boundary layer height BH of the boundary layer region. It is well known in the field how to determine the boundary layer height BH using analytical, empirical, and semi-empirical methods e.g. the one seventh power law.

The embodiment of the present invention illustrated in FIG. 2 provides that scoop 48 and aperture 50 are formed from a section of the cowl boundary wall 12 that is spilt into an upstream part 60 that terminates at a trailing edge 64 and a downstream part 66 that originates at a scoop leading edge 68, which is the lip of the scoop, wherein the downstream part is raised above the upstream part so as to extend into the flowpath thereby forming the scoop and the upstream facing bleed aperture. The scoop leading edge 68 is the generating source for the oblique downstream shockwave 32 and because the leading edge is located at a position in the boundary layer region B, corresponding to the height H of the scoop 48, above upstream part 60 the local flow in the boundary layer at that height remains supersonic and the pressure rise from the downstream oblique shockwave does not propagate upstream.

By swallowing any impinging shockwaves, the scoop 48 eliminates a major source of upstream pressure propagation through the approaching subsonic portion of the boundary layer region B. Simultaneously, the scoop 48 also removes enough of the momentum deficient boundary layer that any required shockwaves from the lip of the upstream facing bleed aperture 50 do not produce upstream propagation of pressure disturbances such as typically result from conventional inlet bleed systems that permit reflection of impinging shockwaves. Another benefit of the present invention is that the oblique downstream shockwave 32 does not influence the pressure on the wall upstream of the scoop thereby reducing or eliminating any increase pressure drag on the centerbody boundary wall 10 due to the downstream oblique shockwave which would occur if, as in the prior art, it was a reflective shockwave off the wall. This also minimizes the source of flow interactions in the boundary layer region B which would reduce the main flow total pressure recovery and increase its distortion. This process may be viewed as longitudinally or axially removing the boundary layer bleed flow Q rather than just through normal or even inclined holes in the centerbody boundary wall 10 as by conventional boundary layer bleed systems thereby significantly reducing turning losses which in turn permits increased total pressure recovery in the bleed plenum 54. Consequently the present invention not only provides a significant reduction in the amount of boundary layer bleed flow Q required for the same increases in total pressure recovery in the bleed plenum 54 and greater reductions in flow distortion levels in the boundary layer region B than achieved by current bleed system concepts, but also a reduction in the momentum drag per unit (mass or volume) bleed flow Q by virtue of the increased total pressure recovery in the bleed plenum.

A more particular embodiment provides a porous section 70 of the upstream part 60 just forward of its trailing edge 64 with small bleed holes 72 that are preferably either normal to the cowl boundary wall 12 or inclined downstream with respect to the direction of the supersonic flow V. The porous section 70 may be useful for removing a small amount of the momentum deficient boundary layer air upstream of the trailing edge 64 in a conventional manner which could be useful in the overall design, drag reduction, and flow stability of the inlet duct 8.

Figure 3:
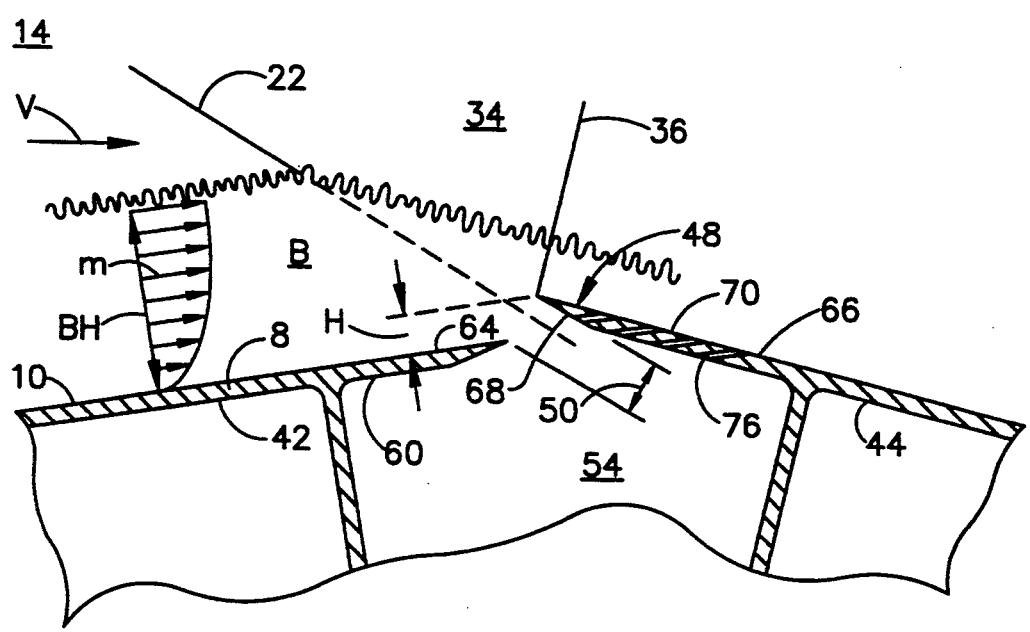
FIG. 3 is a view of a second one of the two embodiments of the present invention illustrated in FIG. 1.

The present invention is also useful at the throat 34 of the inlet duct 8 as illustrated in FIG. 3, in cross-section, wherein the boundary layer scoop 48, transversely extends along the centerbody wall at the shoulder 38 in a direction normal to the plane of the cross-sectional view and normal to the direction of the supersonic flow V of the flowpath 14 and the scoop extends a height H from the centerbody boundary wall 10 into the local boundary layer region B of the flowpath. The upstream facing bleed aperture 50 is located such that the first oblique upstream shockwave 22 passes through the bleed aperture into the bleed plenum 54 at the throat 34 of the inlet duct 8. Preferably the features and elements of the inlet duct 8 are arranged and constructed such that the oblique downstream shockwave 32 also passes through the bleed aperture into the bleed plenum 54 at the throat 34 of the inlet duct 8 as illustrated in the FIGS.

The centerbody wall shoulder 38, the scoop 48 and aperture 50 are formed from a section of the centerbody boundary wall 10 that is spilt into the upstream part 60 that terminates at a trailing edge 64 and a downstream part 66 that originates at a scoop leading edge 68 wherein the downstream part is raised above the upstream part so as to extend into the flowpath thereby forming the scoop and the upstream facing bleed aperture. The downstream part 66 that has a slope in a direction opposite to the slope of the upstream part 60 and originates at the scoop leading edge 68 such that the aperture is disposed generally between the compression ramp 42 and the expansion ramp 44 of the centerbody boundary wall 10. An optional feature of the present invention is supplemental bleed means to prevent the normal shock 36 from moving upstream past the scoop leading edge 68 which could cause "unstart". Unstart is commonly used term referring to a supersonic flow breakdown in the duct which results in significant flow reductions and frequently high and unsteady aerodynamic imposed loads which cause the engine to stop producing useful thrust. This supplemental bleed means for unstart avoidance also uses the porous section 70 but on the downstream part 68 and has upstream inclined bleed holes 76, with respect to the direction of the supersonic flow V, as illustrated in FIG. 2B. The upstream inclined bleed holes 76 have a very low flow coefficient in the presence of supersonic flow, and a very high flow coefficient in the presence of subsonic flow. Such features make them an excellent flow stabilizer to prevent and dampen movement of the normal shock 36. When the normal shock 36 is downstream of the upstream inclined bleed holes 76 there is little bleed through them. When the normal shock 36 migrates upstream of the upstream inclined bleed holes 76 the resulting high bleed rate can stop the forward migration of the normal shock until the source of such activity is corrected by other means.

Many other embodiments of the invention are contemplated such as the already noted two dimensional and axisymmetrical inlet forms. The invention may be used with variable inlets where the cowl and or centerbody leading edges may be both pivotal and axially translatable with respect to centerline. Furthermore either or both the centerbody and cowl boundary walls may be of variable angles and/or compound or multi angled.

While preferred and alternate embodiments of the present invention has been described fully in order to explain its principles, it is understood that various modifications or alterations may be made to the preferred embodiment without departing from the scope of the invention as set forth in the appended claims.

I claim:

1. An inlet bleed system for a supersonic aircraft engine, said inlet bleed system comprising;
   a longitudinally downstream extending inlet duct having a longitudinally downstream extending boundary wall defining in part a supersonic flowpath through said inlet duct,
   a transversely extending boundary layer scoop extending into a boundary layer region of said flowpath and having an upstream facing bleed aperture,
   a shock generating means for generating an upstream oblique shockwave in a supersonic flow in said flowpath such that the shockwave passes through said bleed aperture,
   a section of said boundary wall split into an upstream part and a downstream part wherein said downstream part is raised above said upstream part so as to extend into said flowpath,
   said upstream part terminating at a trailing edge of said upstream part and said downstream part originating at a leading edge of said downstream part forming said scoop and said upstream facing bleed aperture, and
   a porous section of said upstream part of said boundary wall located just forward of said trailing edge wherein said porous section is perforated with small bleed holes disposed at an angle with respect to said porous section of said boundary wall wherein said angle is chosen from a group of angles said group comprised of normal and downstream inclined angles.

2. An inlet bleed system as claimed in claim 1 wherein said scoop extends a height above said wall such that it is operable to scoop off no more than a sufficient amount of a boundary layer flow that would be momentum deficient relative to predetermined conditions that would exist downstream of said scoop under supersonic operating conditions.

3. An inlet bleed system as claimed in claim 2 wherein said sufficient amount of said boundary layer flow corresponds to an amount of flow in a portion of the boundary layer flow having local profile Mach numbers lower than those which would support a predetermined oblique shockwave angle that would be generated by said scoop under supersonic operating conditions.

4. An inlet bleed system as claimed in claim 2 wherein said sufficient amount of said boundary layer flow corresponds to an amount of flow in a portion of the boundary layer having total pressure levels less than downstream static pressure levels required to sustain a downstream oblique shockwave downstream of said aperture and having a predetermined oblique shockwave angle that would be generated by said scoop under supersonic operating conditions.

5. An inlet bleed system as claimed in claim 2 wherein said scoop height is about 18% of a boundary layer height of said boundary layer.

6. An inlet bleed system for a supersonic aircraft engine, said inlet bleed system comprising:
- a longitudinally downstream extending inlet duct having a longitudinally downstream extending boundary wall defining in part a supersonic flowpath through said inlet duct,
- a transversely extending boundary layer scoop extending into a boundary layer region of said flowpath and having an upstream facing bleed aperture said scoop extending a height above said wall such that it is operable to scoop off no more than a sufficient amount of a boundary layer flow that would be momentum deficient relative to predetermined conditions that would exist downstream of said scoop under supersonic operating conditions,
- a shock generating means for generating an upstream oblique shockwave in a supersonic flow in said flowpath such that the shockwave passes through said bleed aperture,
- a section of said boundary wall split into an upstream part and a downstream part wherein said downstream part is raised above said upstream part so as to extend into said flowpath,
- said upstream part terminating at a trailing edge of said upstream part and said downstream part originating at a leading edge of said downstream part forming said scoop and said upstream facing bleed aperture, and
- a porous section of said upstream part of said boundary wall located just forward of said trailing edge wherein said porous section is perforated with small bleed holes.

7. An inlet bleed system as claimed in claim 6 further comprising:
- a throat section of said inlet duct having a convergent section including said upstream part that is at an angle with respect to said downstream part,
- said downstream part is raised above said upstream part so as to extend into said flowpath,
- said upstream part terminating at a trailing edge of said upstream part and said downstream part originating at a leading edge of said downstream part forming said scoop and said upstream facing bleed aperture.

8. An inlet bleed system as claimed in claim 7 wherein said sufficient amount of a boundary layer flow corresponds to an amount of flow in a portion of the boundary layer having total pressure levels less than downstream static pressure levels required to sustain and maintain a normal shockwave no further upstream than said leading edge.

9. An inlet bleed system as claimed in claim 7 wherein said sufficient amount of a boundary layer flow corresponds to an amount of flow in a portion of the boundary layer having local profile Mach numbers lower than those required to sustain and maintain a normal shockwave no further upstream than said leading edge.

10. An inlet bleed system as claimed in claim 7 further comprising a porous section of said downstream part of said boundary wall located aft of said leading edge wherein said porous section is perforated with small upstream inclined bleed holes.

11. An inlet bleed system: for a supersonic aircraft engine, said inlet bleed system comprising;
- a longitudinally downstream extending inlet duct having a longitudinally downstream extending boundary wall defining in part a supersonic flowpath through said inlet duct,
- a transversely extending boundary layer scoop extending into a boundary layer region of said flowpath and having an upstream facing bleed aperture said scoop extending a height above said wall such that it is operable to scoop off no more than a sufficient amount of a boundary layer flow that would be momentum deficient relative to predetermined conditions that would exist downstream of said scoop under supersonic operating conditions,
- a shock generating means for generating an upstream oblique shockwave in a supersonic flow in said flowpath such that the shockwave passes through said bleed aperture,
- a section of said boundary wall split into an upstream part and a downstream part wherein said downstream part is raised above said upstream part so as to extend into said flowpath,
- said upstream part terminating at a trailing edge of said upstream part and said downstream part originating at a leading edge of said downstream part forming said scoop and said upstream facing bleed aperture,
- a throat section of said inlet duct having a convergent section including said upstream part that is at an angle with respect to said downstream part,
- said downstream part is raised above said upstream part so as to extend into said flowpath,
- said upstream part terminating at a trailing edge of said upstream part and said downstream part originating at a leading edge of said downstream part forming said scoop and said upstream facing bleed aperture, and
- a porous section of said downstream part of said boundary wall located aft of said leading edge wherein said porous section is perforated with small upstream inclined bleed holes.

* * * * *